(12) United States Patent
Bruckmann

(10) Patent No.: US 8,324,339 B2
(45) Date of Patent: Dec. 4, 2012

(54) METHOD AND APPARATUS FOR THERMALLY PROCESSING POLYESTER PELLETS

(75) Inventor: Theodor Bruckmann, Xanten (DE)

(73) Assignee: Eastman Chemical Company, Kingsport, TN (US)

( * ) Notice: Subject to any disclaimer, the term of this patent is extended or adjusted under 35 U.S.C. 154(b) by 462 days.

(21) Appl. No.: 10/962,614

(22) Filed: Oct. 13, 2004

(65) Prior Publication Data

US 2005/0085620 A1    Apr. 21, 2005

(30) Foreign Application Priority Data

Oct. 17, 2003   (DE) .................................. 103 49 016
May 3, 2004    (DE) .......................... 10 2004 021 595

(51) Int. Cl.
*C08G 63/78* (2006.01)
*C08J 3/12*  (2006.01)
(52) U.S. Cl. ............... 528/308.1; 528/308.2; 528/308.3; 528/308.4; 528/308.5; 528/308.6; 528/308.7; 528/308.8; 528/481; 528/483; 528/499; 528/503
(58) Field of Classification Search ............... 528/308.1, 528/308.2, 308.3, 308.4, 308.5, 308.6, 308.7, 528/308.8, 481, 483, 499, 503
See application file for complete search history.

(56) References Cited

U.S. PATENT DOCUMENTS

| | | | |
|---|---|---|---|
| 2,958,099 | A | 11/1960 | Chisholm et al. |
| 3,003,193 | A | 10/1961 | Chisholm et al. |
| 3,436,449 | A | 4/1969 | Treu et al. |
| 3,544,525 | A | 12/1970 | Balint et al. |
| 3,675,934 | A | 7/1972 | Heston |
| 3,684,419 | A | 8/1972 | Voight |
| 3,691,644 | A * | 9/1972 | Schnitzer .................. 34/365 |
| 3,988,085 | A | 10/1976 | Krchma |
| 4,223,128 | A | 9/1980 | Halek et al. |
| 4,389,522 | A | 6/1983 | Boeke et al. |
| 4,609,721 | A | 9/1986 | Kirshenbaum et al. |
| 4,632,752 | A | 12/1986 | Hunke |
| 5,119,570 | A * | 6/1992 | Russemeyer et al. ........... 34/363 |
| 5,290,913 | A | 3/1994 | McAllister et al. |
| 5,532,335 | A | 7/1996 | Kimball et al. |
| 5,607,700 | A | 3/1997 | Kando et al. |
| 5,609,892 | A | 3/1997 | Garcia et al. |
| 5,633,018 | A | 3/1997 | Stouffer et al. |
| 5,830,981 | A | 11/1998 | Koreishi et al. |
| 5,895,617 | A | 4/1999 | Mizuguchi et al. |
| 6,110,406 | A | 8/2000 | Ishibashi et al. |
| 6,740,733 | B2 | 5/2004 | Lee et al. |
| 7,084,235 | B2 | 8/2006 | Otto et al. |
| 7,157,032 | B2 * | 1/2007 | Eloo .............. 264/143 |
| 2004/0143034 | A1 | 7/2004 | Primke et al. |
| 2005/0062186 | A1 | 3/2005 | Fellinger |
| 2005/0110182 | A1 | 5/2005 | Eloo |
| 2005/0110184 | A1 | 5/2005 | Eloo |

FOREIGN PATENT DOCUMENTS

| | | |
|---|---|---|
| AT | 410942 | 8/2003 |
| CA | 2381965 | 2/2001 |
| CH | 315245 | 3/1985 |
| CH | 648578 | 3/1985 |
| DE | 1404966 | 10/1968 |
| DE | 1905677 | 10/1969 |
| DE | 19519898 | 12/1996 |
| DE | 19848245 | 5/2000 |
| DE | 10122437 | 11/2002 |
| DE | 10151434 | 4/2003 |
| DE | 10209149 | 9/2003 |
| DE | 102004015515 | 9/2004 |
| DE | 10349016 | 10/2005 |
| EP | 0305862 | 3/1989 |
| EP | 0785226 | 7/1997 |
| EP | 1608696 | 6/2006 |
| GB | 1143182 | 2/1969 |
| GB | 1176719 | 1/1970 |
| GB | 1250690 | 10/1971 |
| GB | 1278297 | 6/1972 |
| GB | 2086915 | 5/1982 |
| WO | 00/23497 | 4/2000 |
| WO | 03/037588 | 5/2003 |
| WO | 2004/033174 | 4/2004 |
| WO | 2005/044901 | 5/2005 |
| WO | 2005051623 | 6/2005 |

OTHER PUBLICATIONS

English Language Translation of DE 102 09 149, published Sep. 18, 2003.
English Language Translation of WO 2004/033174, published Apr. 22, 2004.
Golding, B., Polymers and Resins, Van Nostrand, New York, 1959, p. 287.
Eloo, Michael, Kühlen und Trocknen von Heißgranulaten [Cooling and Drying Hot Cut Pellets], in "Granulieren von Thermoplasten: Systeme im Vergleich/ Jahrestagung Aufbereitungstechnik," [Granulation of Thermoplastics: System in Comparison/ Annual Technical Conference], Baden-Baden, Nov. 24-25, 1999—Düsseldorf, VDI-Verlag GmbH 1999, at 105.
Schäfer, Willi, Unterwassergranulierung: Bauformen, Funktionsweise und Einsatzgebeite [Underwater Pelletizing: Configurations, Operating Mode and Application Ideas], in "Granulieren Von Thermoplastics: Systeme im Vergleich/ Jahrestagung Aufbereitungstechnik," [Granulation of Thermoplastics: System in Comparison/ Annual Technical Conference], Baden-Baden, Nov. 24-25, 1999—Düsseldorf, VDI-Verlag GmbH 1999, at 327.

(Continued)

*Primary Examiner* — Irina S Zemel
(74) *Attorney, Agent, or Firm* — Phan Law Group PLLC

(57) ABSTRACT

Method and apparatus for thermally processing polyester pellets, e.g., polyethylene terephthalate pellets, in order to achieve a partial crystallization, whereby the polyester melt is fed to an underwater pelletizer and pelletized, the pellets obtained are fed to a water/solids separating device and the dried pellets are fed at a pellet temperature of greater than 100°C. to an agitation device that the pellets leave at a pellet temperature of over 100°C.

24 Claims, 1 Drawing Sheet

OTHER PUBLICATIONS

Wölker, Andreas & Simon, Ralf, Unterwassergranulierung: Bauart Bruckman & Kreyenborg Granuliertechnik-Kleingranulierunger. [Underwater Pelletizing: The Bruckmann & Kreyenborg Granulation Technique—Small-size Peletizers], in "Granulieren Von Thermoplasten; Systeme im Vergleich/ Jahrestagung Aufbereitungstechnik," [Granulation of Thermoplastics: System in Comparison/ Annual Technical Conference], Baden-Baden, Nov. 24-25, 1999—Düsseldorf, VDI-Verlag GmbH 1999, at 275.

Partial English translation of Eloo, Michael, Kühlen und Trocknen von Heißgranulaten [Cooling and Drying Hot Cut Pellets], in "Granulieren von Thermoplasten: Systeme im Vergleich/ Jahrestagung Aufbereitungstechnik," [Granulation of Thermoplastics: System in Comparison/ Annual Technical Conference], Baden-Baden, Nov. 24-25, 1999—Düsseldorf, VDI-Verlag GmbH 1999, at 105.

Partial English translation of Schäfer, Willi, Unterwassergranulierung: Bauformen, Funktionsweise und Einsatzgebeite [Underwater Pelletizing: Configurations, Operating Mode and Application Ideas], in "Granulieren Von Thermoplasten: Systeme im Vergleich/ Jahrestagung Aufbereitungstechnik," [Granulation of Thermoplastics: System in Comparison/ Annual Technical Conference], Baden-Baden, Nov. 24-25, 1999—Düsseldorf, VDI-Verlag GmbH 1999, at 327.

Partial English translation of Wölker, Andreas & Simon, Ralf, Unterwassergranulierung: Bauart Bruckman & Kreyenborg Granuliertechnik-Kleingranulierunger. [Underwater Pelletizing: The Bruckmann & Kreyenborg Granulation Technique—Small-size Peletizers], in "Granulieren Von Thermoplasten: Systeme im Vergleich/ Jahrestagung Aufbereitungstechnik," [Granulation of Thermoplastics: System in Comparison/ Annual Technical Conference], Baden-Baden, Nov. 24-25, 1999—Düsseldorf, VDI-Verlag GmbH 1999, at 275.

English language Abstract of DE 19848245, Published May 4, 2000.
English language Abstract of EP 0785226, Published Jul. 23, 1997.
English language Abstract of DE 10151434, Published Apr. 30, 2003.
Reply to Oppositions Against DE Patent 103 49 016, BKG Bruckmann & Kreyenborg Granuliertechnik GmbH, Oct. 6, 2006, pp. 1-32.
Response to BKG Reply in Oppositions Against DE Patent 103 49 016, Gala Industries, Inc., Dec. 29, 2006, pp. 1-19.
Response to BKG Reply in Oppositions Against DE Patent 103 49 016, Rieter Automatik GmbH, Jan. 5, 2007, pp. 1-3.
Reply to Gala and Rieter Responses in Oppositions Against DE Patent 103 49 016, BKG Bruckmann & Kreyenborg Granuliertechnik GmbH, Jan. 11, 2007, pp. 1-3.
Decision in the Opposition Proceedings of DE Patent 103 49 016, German Federal Patent Court, Jan. 25, 2007, pp. 1-12.
Opposition Against European Patent No. 1 608 696, Rieter Automatik GmbH, Mar. 9, 2007, pp. 1-15.
Opposition Against European Patent No. 1 608 696, Gala Industries, Inc., Mar. 20, 2007, pp. 1-28.
Response to Oppositions of Rieter Automatik GmbH and Gala Industries, Inc. Against European Patent No. 1 608 696, BKG Bruckmann & Kreyenborg Granuliertechnik GmbH, Nov. 6, 2007, pp. 1-12.
Reply to BKG Response of Nov. 6, 2007 in Opposition Against European Patent No. 1 608 696, Rieter Automatik GmbH, Jan. 23, 2008, pp. 1-10.
Correspondence to EPO in Opposition to EP 1 608 696, Gala Industries, Inc., Jun. 2, 2009, pp. 1-21.
Correspondence to EPO in Opposition to EP 1 608 696, Rieter Automatik GmbH, Jun. 25, 2009, pp. 1-5.
Decision in Opposition Against European Patent No. 1 608 696, EPO Opposition Division, Aug. 3, 2009, pp. 1-22.
Thermal Analysis T92, "The Transition Method of Plastic Temperature Measurement—According to JIS K 7121-1987-," Shimadzu, Date—Unknown, pp. 1-5.
English Translation of DE 198 48 245 A1, published May 4, 2000, pp. 1-13.
English Language Abstract of DE 102 09 149, Sep. 2003.
English Language Abstract of DE 195 19 898, Dec. 1996.
U.S. Appl. No. 11/095,562 to Jan-Udo Kreyenborg, filed Apr. 1, 2005.
English language abstract of DE 101 22 437, Nov. 2002.
English language abstract of AT 410 942, Aug. 2003.
English language abstract of CH 648 578, Mar. 1985.
Affidavit of Donald W. Smith dated Feb. 21, 2006.
Affidavit of Ray Harris dated Mar. 8, 2006.
Rompp-Lexikon Chemie, 10, vollig uberarb. Aufl. 1998, Bd. 4, ISBN 3-13-734910-9, S.3211.

* cited by examiner

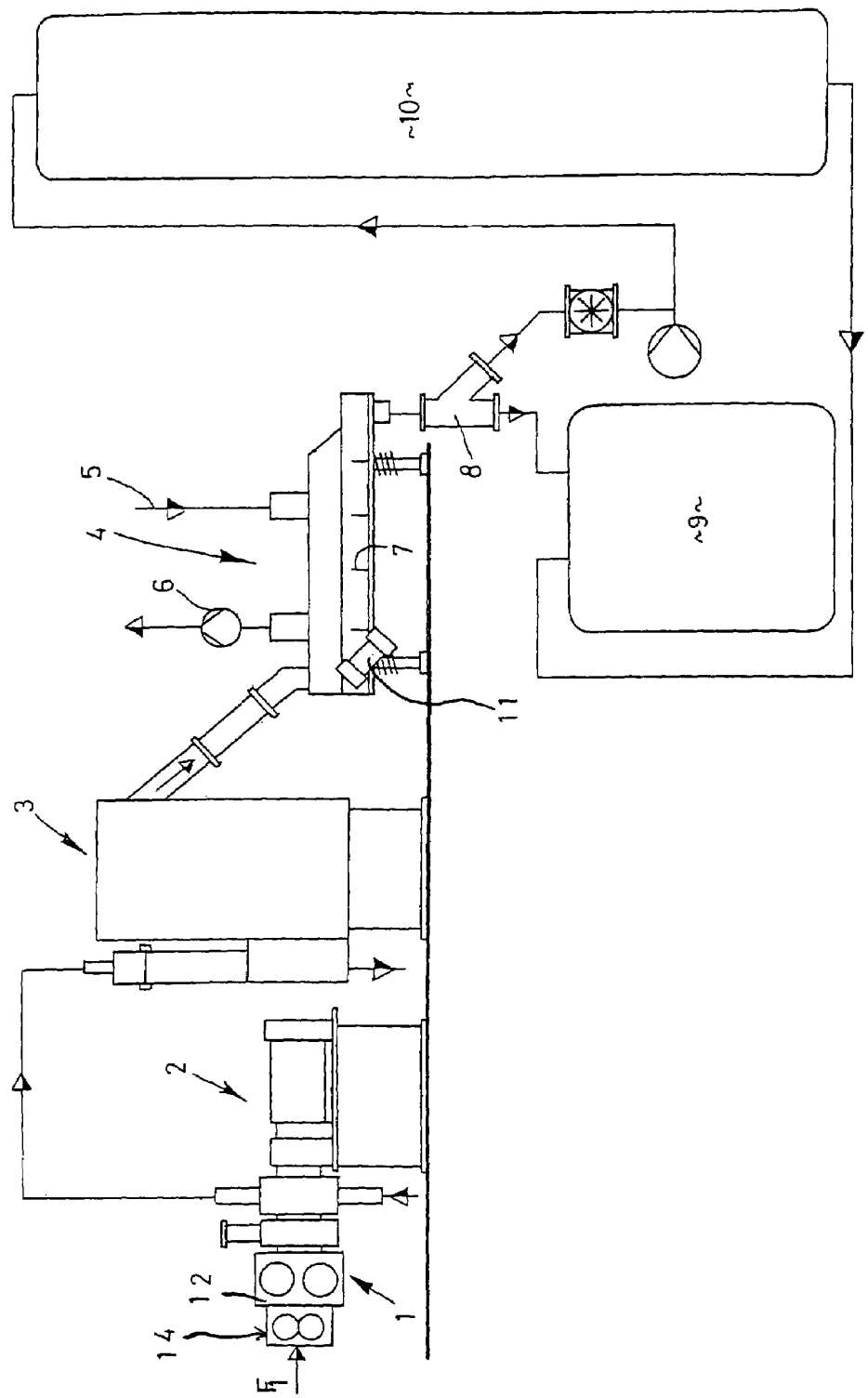

METHOD AND APPARATUS FOR THERMALLY PROCESSING POLYESTER PELLETS

CROSS-REFERENCE TO RELATED APPLICATIONS

The present application claims priority under 35 U.S.C. 119 of German Patent Application No. 103 49 016.7-43, filed Oct. 17, 2003, and German Patent Application No. 10 2004 021 595.2, filed May 3, 2004, the disclosures of which are expressly incorporated by reference herein in their entireties.

BACKGROUND OF THE INVENTION

1. Field of the Invention

The invention relates to a method for thermally processing polyester pellets in order to achieve crystallization.

2. Discussion of Background Information

Polyethylene terephthalate, hereinafter also referred to herein as PET for short, is a polyester with repeating ester groups.

PET can be present in different structures, namely in amorphous or in crystalline or partially crystalline form. Amorphous PET is mostly transparent, and crystalline PET is opaque or white. As with all thermoplastics that can be present in amorphous or crystalline form, a 100% degree of crystallization is also not possible with PET. Only a portion of the structure of the PET is able to orient itself, i.e., to crystallize, and PET includes crystalline and amorphous regions which alternate. Therefore, PET is always referred to with respect to partial crystallinity. An approximate 50% degree of crystallinity can be achieved with PET in order to prevent the pellets or granules from sticking to one another. This means that in this state about half of the molecule chains have oriented themselves to one another, and thus have laid themselves parallel next to one another or have wound themselves in a circular manner. The interactions (van der Waals forces) between the molecular chains therefore inevitably become greater in the partially crystalline regions. The chains thus mutually attract one another and thus gaps between the molecules become smaller.

As a thermoplastic, PET can be molded at temperatures of 250° C. The molecular chains then become so mobile that the plastic melts and a viscous mass results that can be made into virtually any desired shape. When it cools, the molecular chains refreeze, and the plastic solidifies in the desired shape—a simple principle that can be repeated multiple times. This method is also used, e.g., in the production of PET bottles. So-called preforms are produced in a first step. As a precursor of the PET bottles, these preforms already have a finished screw thread. In order to obtain proper bottles, they are again softened at 100° C., stretched with compressed air and blown to produce a bottle (stretch blow process).

The production of crystallized PET in pellet form hitherto comprised extensive and complicated fluidized bed methods that required large investments and high operating costs, such as DE 198 48 245 A and its family member WO 00/23497, which are incorporated by reference herein in their entireties.

PET pellets have to be crystallized at a temperature below that at which the material becomes sticky in order to prevent the pellets coalescing into a solid mass that can barely be processed. Although the melting temperature of the crystallized polyester is not reached until 240 to 250° C., it can already become sticky before crystallization at temperatures above approx. 70° C.

In so far as continuous methods for producing dry PET pellets are known, in general they require very large installations, since long crystallization times are necessary.

Thus, for example, U.S. Pat. No. 5,532,335, which is incorporated by reference herein in its entirety, is directed to a method for thermally processing polyester pellets in which the pellets are introduced into a processing vessel and a liquid medium is also introduced into this processing vessel, whereby the pellets and the liquid medium are mixed together. Pressurized water or so-called superheated water is used hereby as a liquid medium in the proposed process. The boiling temperature can easily be controlled by changing the pressure in the reactor vessel. In an exemplary embodiment polyester pellets are processed at 120°-182° C. The water is introduced at 160° C., kept in the liquid state and the pellets are added as long as the pressure in the reactor unit is kept at 7 kg/cm² or higher. It is evident that such a method is extraordinarily expensive and therefore can barely be conducted economically.

Known methods that work with an aerodynamic processing also have the serious disadvantage that they use a large amount of inert gases. The energy and processing costs are also too high here for a practical large-scale application.

In order to sufficiently crystallize the material in the prior art it was therefore always necessary to add sufficient external energy or heat to the crystallization process. These cited problems have hitherto hampered PET recycling.

SUMMARY OF THE INVENTION

The present invention relates to a method for crystallizing PET pellets that is possible without the addition of external energy or heat and that does not require long dwell times.

The present invention relates to a method for thermally processing polyester pellets in order to achieve partial crystallization, comprising feeding polyester melt to an underwater pelletizer and pelletizing the polyester melt in the underwater pelletizer to obtain pellets, feeding the pellets to a water/solids separating device to dry the pellets, feeding the dried pellets at a pellet temperature of greater than 100° C. to an agitation device, and removing pellets from the agitation device at a pellet temperature of over 80° C.

The present invention also relates to an apparatus for carrying out a method for the thermal processing of polyester pellets in order to achieve a partial crystallization of the pellets, the apparatus comprising a melt pump; a screen changer; an underwater pelletizer; a water/solids separating device; and a conveyor device for transporting pellets, the conveyor device being arranged downstream of said underwater pelletizer and said water/solids separating device, said conveyor device being constructed and arranged to agitate pellets and crystallize pellets during transport through specific heat of the pellets.

The method can further include flowing a fluid around the pellets during agitation of the pellets in the agitation device.

The pellets can be in a form of a pellet layer, and further comprising flowing a fluid around the pellet layer during agitation of the pellets in the agitation device.

The pellets can be fed to the agitation device at a pellet surface temperature of over 110° C.

The pellets can be conveyed from the underwater pelletizer to the water/solids separating device with hot process water.

The process water can have a temperature of 98° C.

The thermal processing leading to partial crystallization can utilize specific heat present in the pellets.

The polyester pellets can comprise polyethylene terephthalate pellets.

The conveyor device can comprise a conveyor channel.

The conveyor device can comprise a vibrating conveyor device.

The vibrating conveyor device can comprise a conveyor channel.

The conveyor device can a plurality of spaced apart dams distributed over the length of the conveyor device or conveyor channel, each of said plurality of spaced apart dams causing a damming up of material.

The conveyor device can be surrounded at least in part by a housing in such manner that it may optionally be insulated so that calorific loss of the pellets present on the conveyor device may be reduced. This optional arrangement prevents a direct heat exchange with the environment.

The water/solids separating device can comprise a centrifuge.

In other words, it is proposed that the PET starting material is extruded in an extruder at a suitable temperature. Subsequently impurities are filtered out using, e.g., screen changer technology. The polymer melt is fed to an "underwater hot strike off pelletizing system," referred to below as "underwater pelletization," and processed into pellets that due to the underwater pelletization have a ball shape or a lenticular shape and have a high core temperature.

These PET pellets are conveyed via a conveyor line at high speed to a water/solids separation device, whereby hot water, preferably up to 98° C., is used as a flow medium. One important aspect for the effectiveness of the method according to the invention is relatively short conveyor paths between the pelletization chamber and the water/solids separating device. The PET pellets leave the water/solids separating device at a core temperature of 130-180° C., since it is ensured that the extrusion temperature of the PET is maintained for as long as possible.

The pellets having this temperature are then subjected to an agitation whereby the crystallization begins. This crystallization according to the method according to the invention is determined by the specific heat and it is thus achieved that the product, i.e., the pellets, do not agglomerate and no longer stick to one another. This effect is also increased in that the product to be crystallized has a ball shape or a lenticular shape, and thus manages with the smallest possible contact surfaces to one another.

It can be provided, as a supporting measure to prevent such agglomeration into a massive block, to shake the pellets during the heat treatment or expose them to vibrations. In an advantageous, cost-effective embodiment, it can be prescribed to convey the pellets during heat treatment over a vibrating conveyor or oscillating conveyor, so that, on the one hand, the pellets are conveyed to a subsequent processing unit, and, on the other hand, agglomeration of the pellets is effectively prevented by the vibrations acting on them. In order to ensure the pellets sufficient dwell for the heat treatment, it can be advantageously provided to use a spiral conveyor instead of an oscillating chute conveyor. By removing the pellets after they have traveled through a certain height difference, the dwell time of the pellets on the spiral conveyor can be influenced depending on this height difference, so that sufficient dwell time can be chosen to reliably ensure that the pellets then have a temperature level that reliably rules out agglomeration with each other.

The dwell time of the ball-shaped pellets in the agitation phase as the pellets pass through an agitation apparatus, such as a conveying device, is, e.g., 3 to 8 minutes and after this phase has been completed, up to 40% and more of the PET pellets are crystallized and have a temperature of greater than 100° C. The transport of the hot PET pellets into a storage silo or subsequent processing station is possible, since the pellets no longer stick together.

Another object of the invention is to propose a device with which the effective agitation of the pellets is possible.

Preferably, a so-called crystallization channel is provided as the agitation device for the pellets. This crystallization channel is constructed in a similar manner to a pellet conveyor channel, but, seen in the conveyor direction, is divided into successive chambers that are separated from one another by dams. The crystallization channel has vibration motors so that the pellets located therein are permanently agitated and thus can give off their intrinsic energy to other pellets. A rotation of the PET pellets takes place in the individual chambers and a sticking of the pellets is no longer possible.

With the method according to the invention and the apparatus according to the invention a gentle, economic and rapid crystallization of PET pellets is achieved.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the sole FIGURE of drawings by way of non-limiting example of exemplary embodiments of the present invention.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

In the drawing, 1 is used to label a melt pump 14 and a screen changer 12 to which a polyester is fed according to the arrow $F_1$. At the outlet of the screen changer 12, an underwater pelletizer 2 is provided through which pellets with a ball shape or a lenticular shape are produced. These pellets are guided through a conveyor device to a water/solids separating device 3, e.g., a centrifuge, whereby the conveying is carried out by process water that preferably has a temperature of over 80° C. The pellets leave the water/solids separating device 3 at a temperature of over 110° C. and are fed to a conveyor channel 4 to which supply air can be fed at 5 that leaves the conveyor device 4 at 6 and ensures a removal of the moisture. The conveyor device 4 is embodied as a conveyor channel with dams 7 aligned crosswise with respect to the conveyor direction and vibration motor 11, and the pellets leave the conveyor device 4 at a pellet temperature of over 100° C. and can be fed via a so-called pellet diverter valve 8 to an after treatment device 9 or a silo 10.

These pellets are crystallized at least to 40%, and can be handled.

Surface temperature of pellets according to the present invention can be measured by contactless infrared devices, such as those that are readily available in the market, e.g., model "Raynger MX" of the brand "RAYTEC", which model is pistol-shaped and with which a surface temperature can be measured over a distance of several feet.

Moreover, the surface temperature of the pellets can be estimated as being around 20° C. to 30° C. lower than the core temperature of the pellets, so that by measuring the surface temperature of the pellets, a rough idea of the core temperature can be deducted. Accordingly, measurement of the surface temperature can provide an estimation of the core temperature of the pellets by adding about 20° C. to 30° C. to the measured surface temperature.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. Method for thermally processing polyester pellets in order to achieve partial crystallization, comprising
feeding polyester melt to an underwater pelletizer,
pelletizing the polyester melt in the underwater pelletizer to obtain pellets,
conveying the pellets from the underwater pelletizer with process water having a temperature of over 80°C. to a water/solids separating device to dry the pellets,
feeding the dried pellets at a pellet surface temperature of greater than 100° C. to an agitation device, which comprises a vibrating conveyor device,
agitating and crystallizing the pellets in the agitation device wherein the crystallization uses specific heat present in the pellets, and
removing partially crystallized pellets from the agitation device at a pellet surface temperature of over 80° C.

2. The method according to claim 1, wherein the pellets while in the agitation device form a pellet layer, and further comprising flowing a fluid around the pellet layer during agitation of the pellets in the agitation device.

3. The method according to claim 1, wherein the pellets are fed to the agitation device at a pellet surface temperature of over 110° C.

4. The method according to claim 3, further comprising flowing a fluid around the pellets during agitation of the pellets in the agitation device.

5. The method according to claim 3, wherein the pellets while in the agitation device form a pellet layer, and further comprising flowing a fluid around the pellet layer during agitation of the pellets in the agitation device.

6. The method according to claim 1, wherein the process water has a tempurature of up to 98°C.

7. The method according to claim 6, wherein the process water has a temperature of 98° C.

8. The method according to claim 1, wherein the polyester pellets comprise polyethylene terephthalate pellets.

9. The method according to claim 1, wherein the vibrating conveyor device comprises a conveyor channel.

10. The method according to claim 9, wherein the vibrator conveyor device comprises a plurality of spaced apart dams distributed over a length of the vibrating conveyor device, each of said plurality of spaced apart dams causing a damming up of pellets.

11. The method according to claim 9, wherein the vibrating conveyor device is surrounded at least in part by a housing.

12. The method according to claim 1, wherein the water/solids separating device comprises a centrifuge.

13. The method according to claim 1, wherein the dried pellets from the water/solids separating device have a core temperature of 130 to 180° C.

14. The method according to claim 7, wherein the dried pellets from the water/solids separating device have a core temperature of 130 to 180° C.

15. The method according to claim 8, wherein the dried pellets from the water/solids separating device have a core temperature of 130 to 180° C.

16. The method according to claim 1, wherein the pellets removed from the agitation device have a pellet surface temperature of over 100° C.

17. The method according to claim 3, wherein the pellets removed from the agitation device have a pellet surface temperature of over 100° C.

18. The method according to claim 15, wherein the pellets removed from the agitation device have a pellet surface temperature of over 100° C.

19. The method according to claim 1, further comprising flowing a fluid around the pellets during agitation of the pellets in the agitation device.

20. The method according to claim 1, wherein the vibrating conveyor device comprises a vibration motor.

21. Method for thermally processing polyester pellets in order to achieve partial crystallization, comprising
feeding polyester melt to an underwater pelletizer,
pelletizing the polyester melt in the underwater pelletizer to obtain pellets,
conveying the pellets from the underwater pelletizer to a water/solids separating device to dry the pellets,
feeding the dried pellets at a pellet surface temperature of greater than 100° C. to an agitation device comprising a vibrating conveyor, an oscillating conveyor, or a spiral conveyor;
agitating and crystallizing the pellets in the agitation device wherein the crystallization uses specific heat present in the pellets, and
removing partially crystallized pellets from the agitation device at a pellet surface temperature of over 80° C.

22. The method according to claim 21, wherein the pellets from the underwater pelletizer are conveyed to the water/solids separating device with process water having a temperature of over 80° C.

23. The method according to claim 22, wherein the process water has a temperature of up to 98° C.

24. The method according to claim 21, wherein the polyester pellets comprise polyethylene terephthalate pellets.

* * * * *